(12) United States Patent
Fujimoto

(10) Patent No.: US 11,581,779 B2
(45) Date of Patent: Feb. 14, 2023

(54) MACHINED OBJECT INCLUDING MACHINED SURFACE AND COATING SURFACE, AND METHOD OF MANUFACTURING MACHINED OBJECT

(71) Applicant: FANUC CORPORATION, Yamanashi (JP)

(72) Inventor: Jun Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 517 days.

(21) Appl. No.: 16/699,110

(22) Filed: Nov. 29, 2019

(65) Prior Publication Data

US 2020/0185999 A1    Jun. 11, 2020

(30) Foreign Application Priority Data

Dec. 6, 2018  (JP) .............................. JP2018-228822

(51) Int. Cl.
*H02K 5/22*  (2006.01)
*H02K 15/14*  (2006.01)
*H02K 1/18*  (2006.01)

(52) U.S. Cl.
CPC ................. *H02K 5/22* (2013.01); *H02K 1/18* (2013.01); *H02K 15/14* (2013.01)

(58) Field of Classification Search
CPC ................................ H02K 15/14; H02K 1/18
USPC ....................................................... 310/89, 85
See application file for complete search history.

(56) References Cited

FOREIGN PATENT DOCUMENTS

| JP | S59174631 A | | 10/1984 |
|----|----|----|----|
| JP | 11303307 A | * | 11/1999 |
| JP | 2009241384 A | * | 10/2009 |
| JP | 2009241384 A | | 10/2009 |
| JP | 2013-236430 A | | 11/2013 |

* cited by examiner

*Primary Examiner* — Jose A Gonzalez Quinones
(74) *Attorney, Agent, or Firm* — Hauptman Ham, LLP

(57) ABSTRACT

A machined object that can prevent a coating material of a coating surface from peeling off when a machined surface that is adjacent to the coating surface is machined after coating of the coating surface. The machined object includes a main body and a coating material applied to the main body, the main body includes a machined surface that is machined, a coating surface that is arranged adjacent the machined surface via a boundary and to which a coating material is applied, and a recess formed in the main body and recessed toward an inner side of the main body from the machined surface and the coating surface at the boundary, and the recess extends along the boundary so as to separate the machined surface and the coating surface from each other.

11 Claims, 15 Drawing Sheets

MACHINED OBJECT INCLUDING MACHINED SURFACE AND COATING SURFACE, AND METHOD OF MANUFACTURING MACHINED OBJECT

RELATED APPLICATIONS

The present application claims priority of Japanese Patent Application No. 2018-228822, filed Dec. 6, 2018, the disclosure of which is hereby incorporated by reference herein in its entirety.

BACKGROUND OF THE INVENTION

1. Field of the Invention

The present invention relates to a machined object including a machined surface and a coating surface, and a method of manufacturing the machined object.

2. Description of the Related Art

A stator of a rotary electric motor is known (e.g., JP-A-2013-236430). Such a stator may include a machined object (stator housing, flange member, or the like) including a machined surface that is machined by a lathe or the like, and a coating surface (e.g., an outer circumferential surface) to which a coating material is applied.

In the related art, when a machined surface that is adjacent to a coating surface is machined after coating of the coating surface, the coating material on the coating surface may be peeled off.

SUMMARY OF THE INVENTION

In an aspect of the present disclosure, a machined object includes a main body and a coating material applied to the main body, wherein the main body includes a machined surface that has been machined; a coating surface arranged adjacent to the machined surface via a boundary, the coating material being applied to the coating surface; and a recess formed at the main body so as to be recessed inward of the main body from the machined surface and the coating surface at the boundary, the recess extending along the boundary so as to separate the machined surface and the coating surface from each other.

According to the present disclosure, the coating surface and the machined surface are separated from each other by the recess, thus, even if the machined surface adjacent to the coating surface is machined after coating of the coating surface, only the coating material on the surface of the recess is peeled off, and a coating material of a coating surface can be prevented from peeling off.

DETAILED DESCRIPTION

Figure 1:
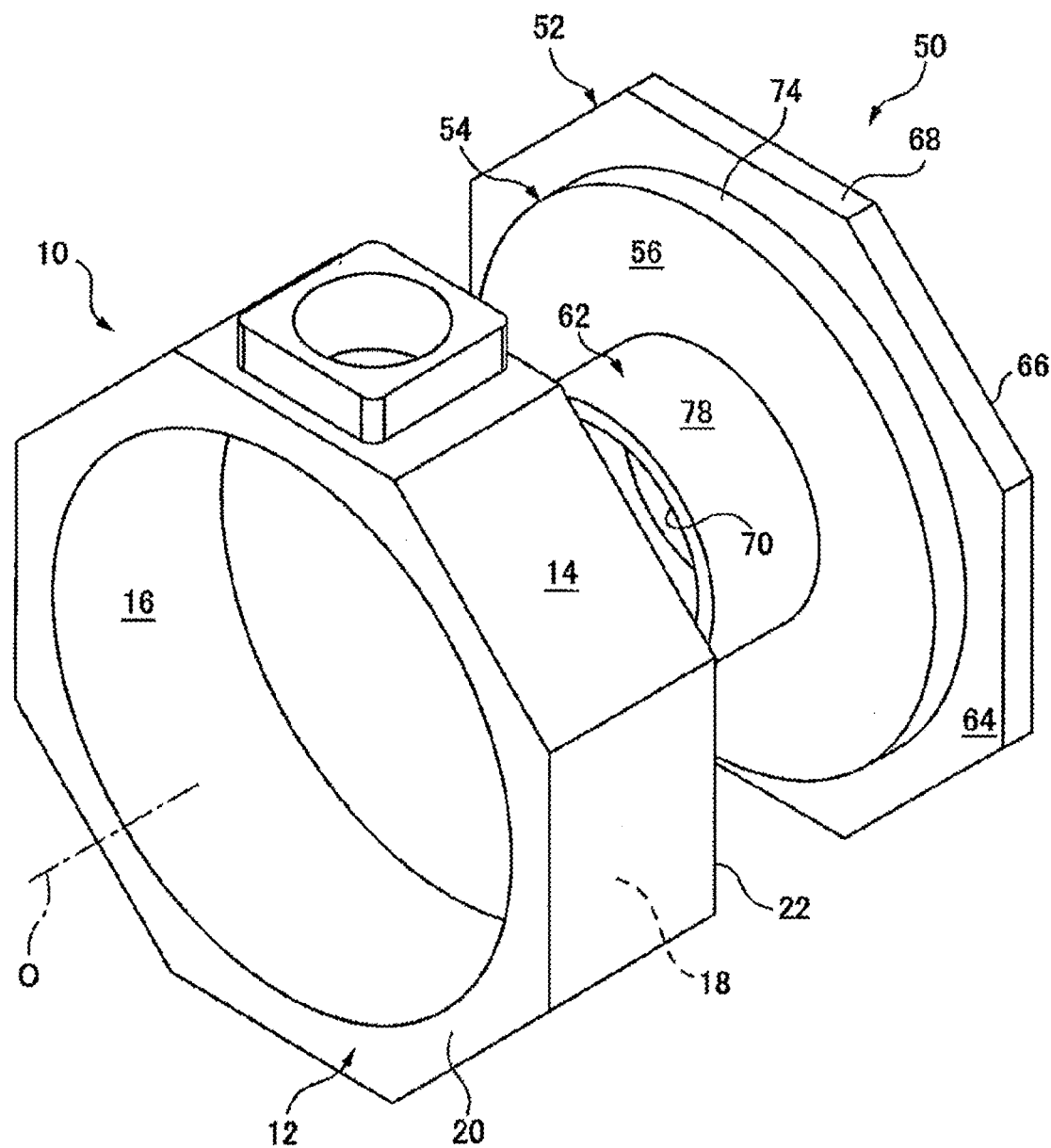
FIG. 1 is a front perspective view of a machined object of an embodiment.
Figure 2:
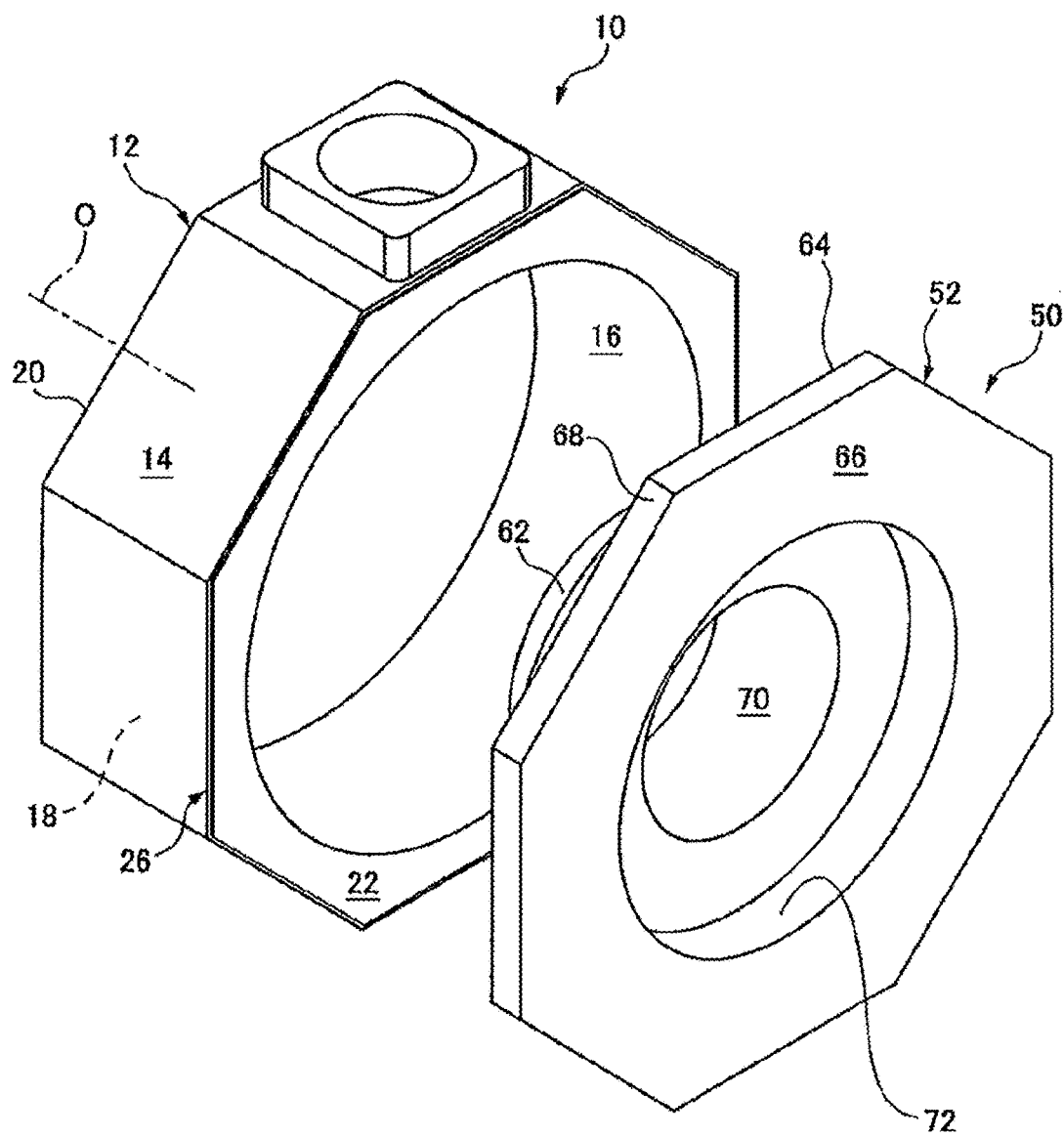
FIG. 2 is a rear perspective view of the machined object illustrated in FIG. 1.
Figure 3:
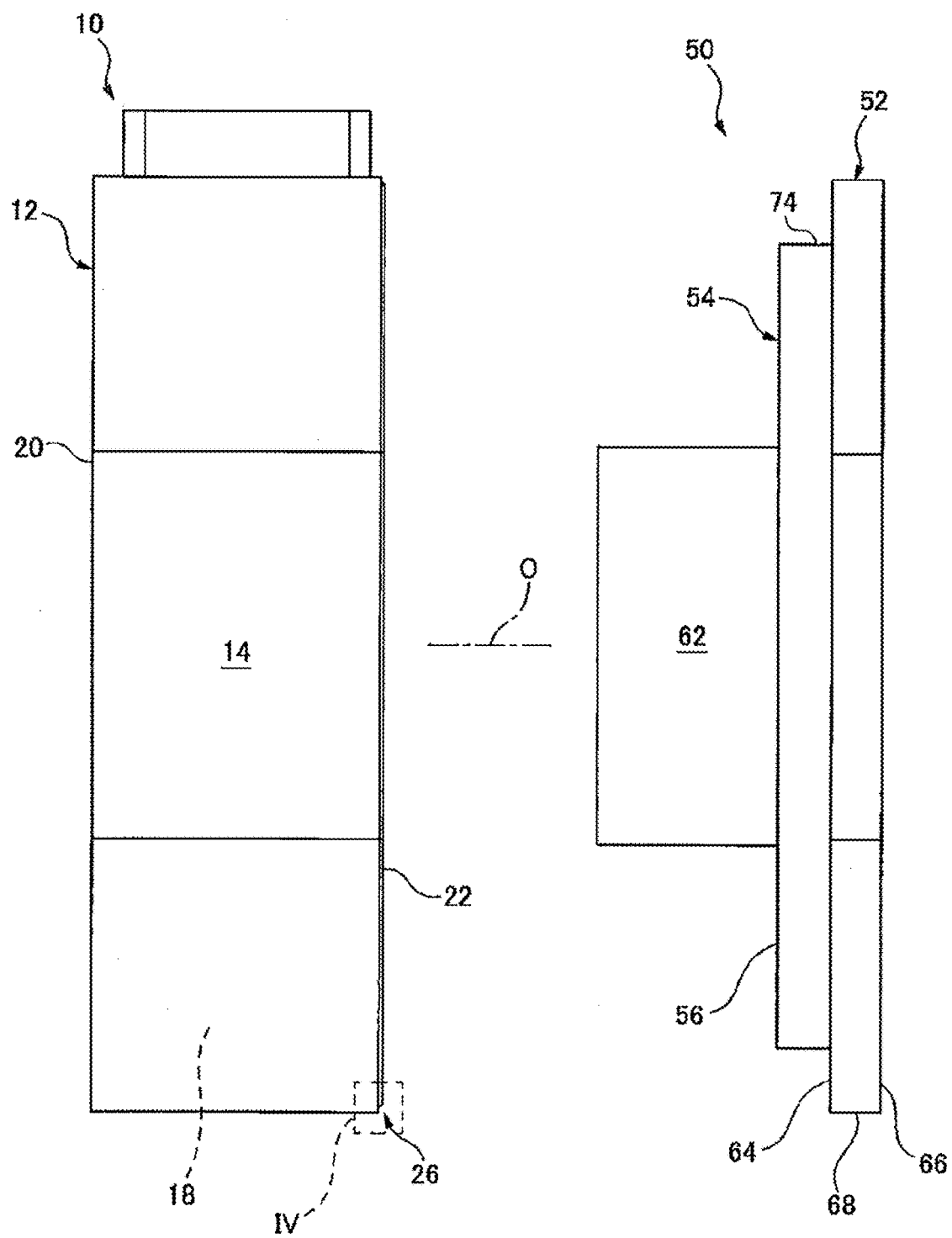
FIG. 3 is a side view of the machined object illustrated in FIG. 1.

Hereinafter, embodiments of the present disclosure will be described in detail based on the drawings. Note that, in the various embodiments described below, the same elements are denoted by the same reference numerals, and redundant descriptions thereof will be omitted. Further, in the following description, an axial direction indicates a direction along a central axis O of machined objects 10 and 50, and a radial direction indicates a radial direction of a circle centered about the axis O, and a circumferential direction indicates a circumferential direction of the circle. In addition, for convenience, a direction toward the left side of the drawings is referred to as axially frontward.

First, referring to FIG. 1 to FIG. 4, the machined object 10 of an embodiment is described. The machined object 10 is e.g. a stator housing of a stator of an electric motor, and coupled to the machined object 50. The machined object 10 includes a main body 12 and a coating (or paint) material 14. The main body 12 is a cylindrical member having the central axis O, and made of e.g. a metal (iron, aluminum, or the like).

The main body 12 includes an inner circumferential surface 16, a coating surface 18 opposite the inner circumferential surface 16, an axially front end face 20, a machined surface 22 opposite the end face 20, and a recess 26 formed at a boundary between the machined surface 22 and the coating surface 18. The inner circumferential surface 16 is an annular surface that surrounds the axis O, and defines a through hole passing through a central portion of the main body 12 in the axial direction.

The coating surface 18 is a cylindrical surface having a substantially octagonal shape when viewed from the axial direction, and arranged so as to surround the axis O. The coating surface 18 is arranged adjacent to the machined surface 22 via the boundary, and defines an outer circumferential surface of the main body 12 opposite the inner circumferential surface 16. The end face 20 and the machined surface 22 extend between the inner circumferential surface 16 and the coating surface 18 so as to be parallel to each other.

In the present embodiment, the end face 20 and the machined surface 22 are substantially orthogonal to the coating surface 18 (or the axis O). In other words, a virtual extension surface obtained by extending the machined surface 22 radially outward intersects with a virtual extension surface obtained by extending the coating surface 18 axially rearward by an angle of 90°. The machined surface 22 defines an axially rear end face of the main body 12 opposite the end face 20. The machined surface 22 has been machined by a machine tool, such as a lathe, a milling machine, or a machining center.

Figure 4:
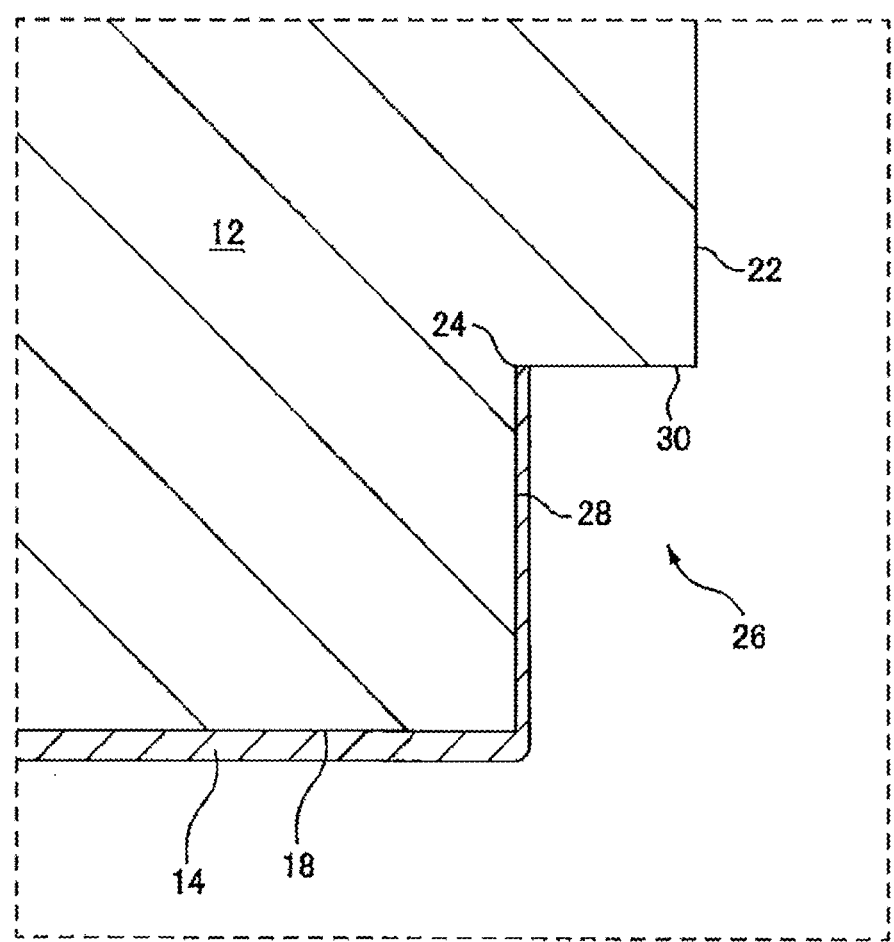
FIG. 4 is an enlarged cross-sectional view of a region IV in FIG. 3.

The recess 26 is formed at the main body 12 so as to be recessed inward of the main body 12 from the machined surface 22 and the coating surface 18 at the boundary of the machined surface 22 and the coating surface 18. Specifically, as illustrated in FIG. 4, the recess 26 is defined by a first surface 28 extending radially inward from an axial rear end of the coating surface 18 and a second surface 30 extending axially frontward from a radially outer end of the machined surface 22 so as to be connected to the first surface 28.

The first surface 28 is an annular flat surface surrounding the axis O and orthogonal to the axis O, while the second surface 30 is a circular-cylindrical surface surrounding the axis O. The first surface 28 and the second surface 30 intersect with each other so as to form an angle of 90° (i.e., are orthogonal to each other). The recess 26 extends in the circumferential direction along the boundary of the coating surface 18 and the machined surface 22, and separates the coating surface 18 and the machined surface 22 from each other. The technical significance of the recess 26 will be described later.

The coating material 14 is applied to the coating surface 18 of the main body 12. The coating material 14 is provided in order to improve the aesthetics of the appearance of the machined object 10 and prevent rusting of the coating surface 18. In addition, if the coating material 14 is black, the heat dissipation performance of the machined object 10 can also be improved by the coating material 14. Note that, in the present embodiment, the coating material 14 is also attached to the first surface 28 of the recess 26.

The machined object 50 is e.g. a flange member fixed to the axial end of the stator housing of the electric motor, and is made of e.g. metal. Specifically, the machined object 50 is a cylindrical member centered about the central axis O, and includes a base plate 52, a first boss 54 protruding axially frontward from an axially front end face 64 of the base plate 52, and an annular second boss 62 protruding axially frontward from an axially front end face 56 of the first boss 54.

The base plate 52 includes an end face 64, an axially rearward end face 66 opposite the end face 64, and an outer circumferential surface 68 extending between the end face 64 and the end face 66. The end faces 64 and 66 are arranged parallel to each other, and are substantially orthogonal to the outer circumferential surface 68 (or the axis O). The outer circumferential surface 68 is a cylindrical surface having a substantially octagonal shape when viewed from an axial direction, similar to the coating surface 18 described above.

A through hole 70 is formed at a center of the second boss 62, while a hole 72 (FIG. 2) is formed at a center of the base plate 52 and the first boss 54 so as to be recessed axially frontward from the end face 66 of the base plate 52. In the present embodiment, the end face 64 of the base plate 52, the outer circumferential surface 74 and the axially front end face 56 of the first boss 54, and the outer circumferential surface 78 of the second boss 62 are machined surfaces that have been machined, similar to the machined surface 22 described above.

The machined object 50 is coupled to the machined object 10 so as to be concentric with the machined object 10. When the machined objects 10 and 50 are coupled with each other, the first boss 54 and the second boss 62 are inserted into the through hole defined by the inner circumferential surface 16 of the machined object 10. At this time, the machined surface 22 of the machined object 10 and the end face 64 of the machined object 50 are in surface-contact with each other, and the inner circumferential surface 16 of the machined object 10 and the outer circumferential surface 74 of the first boss 54 of the machined object 50 face (or contact) each other.

Figure 5:
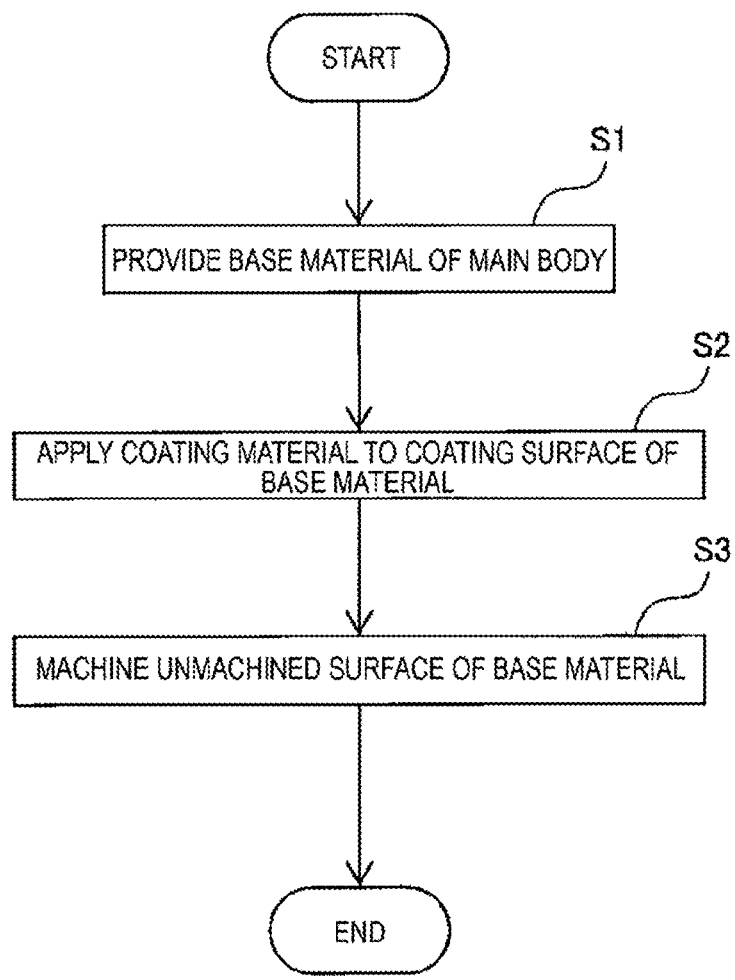
FIG. 5 is a flowchart illustrating an example of a manufacturing method of the machined object illustrated in FIG. 1.
Figure 6:
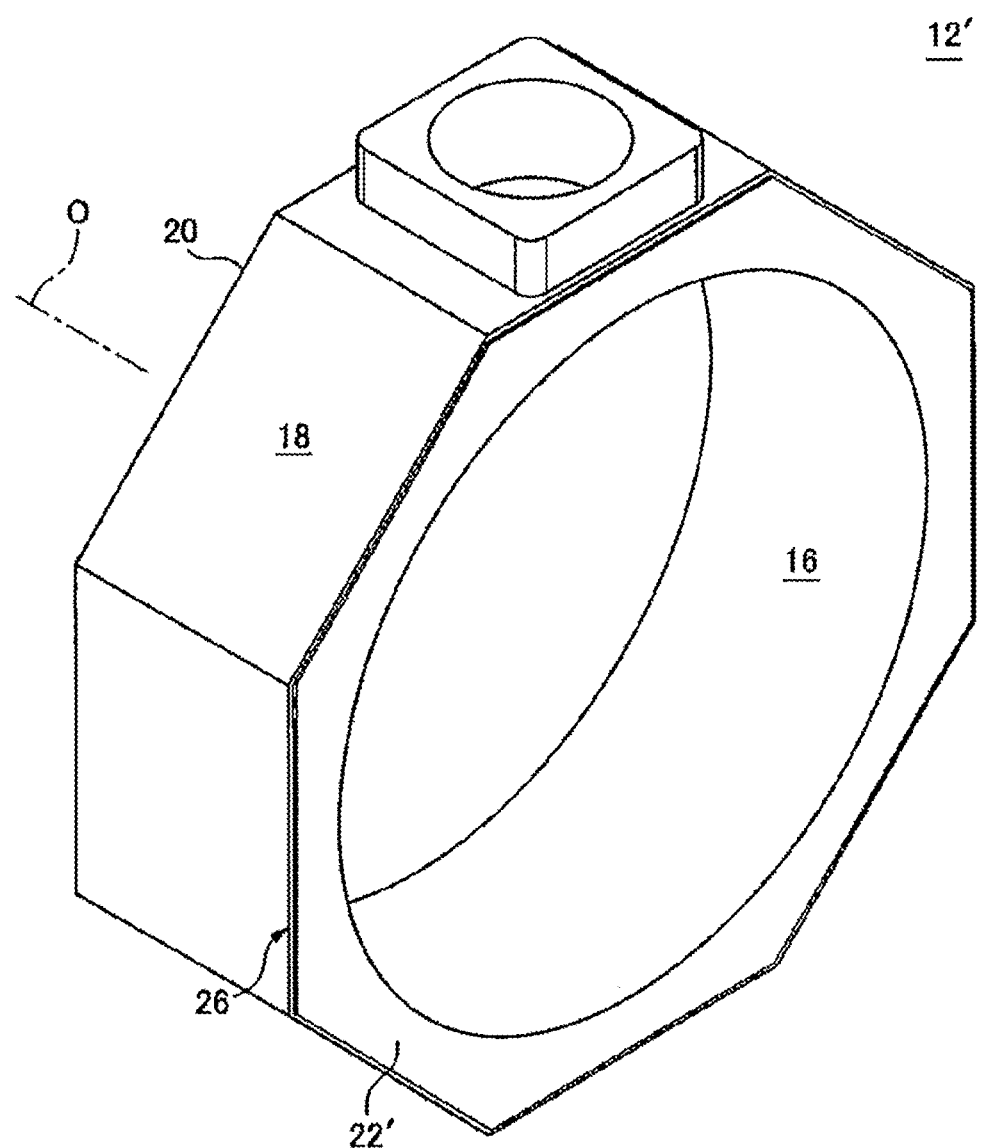
FIG. 6 is a rear perspective view of a base material of a main body illustrated in FIG. 1.

Next, referring to FIG. 5 to FIG. 9, a method of manufacturing the machined object 10 will be described. Referring to FIG. 5, in step S1, a manufacturer provides a base material 12' (FIG. 6) of the main body 12. For example, the base material 12' is made by die casting. As illustrated in FIG. 6, the base material 12' has substantially the same outer shape as the above-described main body 12, and includes the inner circumferential surface 16, the coating surface 18, the end face 20, an unmachined surface 22', and the recess 26 formed at a boundary of the unmachined surface 22' and the coating surface 18. The unmachined surface 22' is a surface corresponding to the machined surface 22, and is a rough surface that is not machined. The coating surface 18 is arranged adjacent to the unmachined surface 22' via the boundary.

Alternatively, in this step S1, the manufacturer may first provide a base material including the inner circumferential surface 16, the coating surface 18, the end face 20, and the unmachined surface 22', but not including the recess 26, and then, machine the base material so as to form the recess 26, thereby manufacturing the base material 12' illustrated in FIG. 6.

Figure 7:
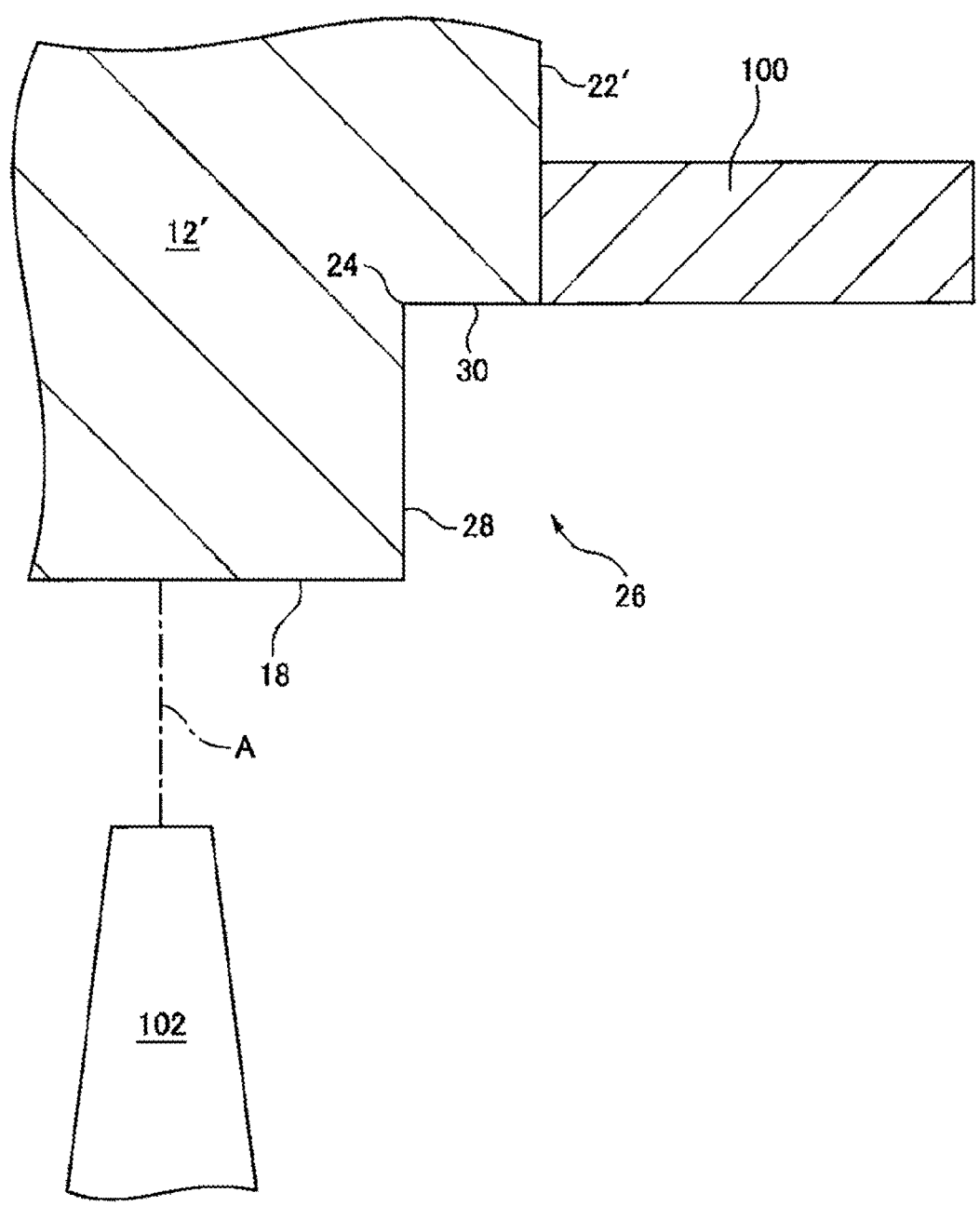
FIG. 7 is a diagram for explaining step S2 in FIG. 5, and is an enlarged cross-sectional view corresponding to FIG. 4.

In step S2, the manufacturer applies a coating material to the coating surface 18 of the base material 12'. Specifically, as illustrated in FIG. 7, the manufacturer first disposes a mask member 100 on the radially outer end of the unmachined surface 22'. The mask member 100 is for protecting the unmachined surface 22' from the coating material. Note that the mask member 100 may be configured to cover the entire region of the unmachined surface 22'.

Then, the manufacturer disposes a coating-material applicator (sprayer) 102 relative to the coating surface 18 such that a spray axis A of the coating material sprayed from the coating material applicator 102 intersects (e.g., orthogonally) with the coating surface 18. Then, the manufacturer operates the coating material applicator 102 so as to spray a liquid coating material toward the coating surface 18 to coat the coating surface 18 with the coating material.

Figure 8:
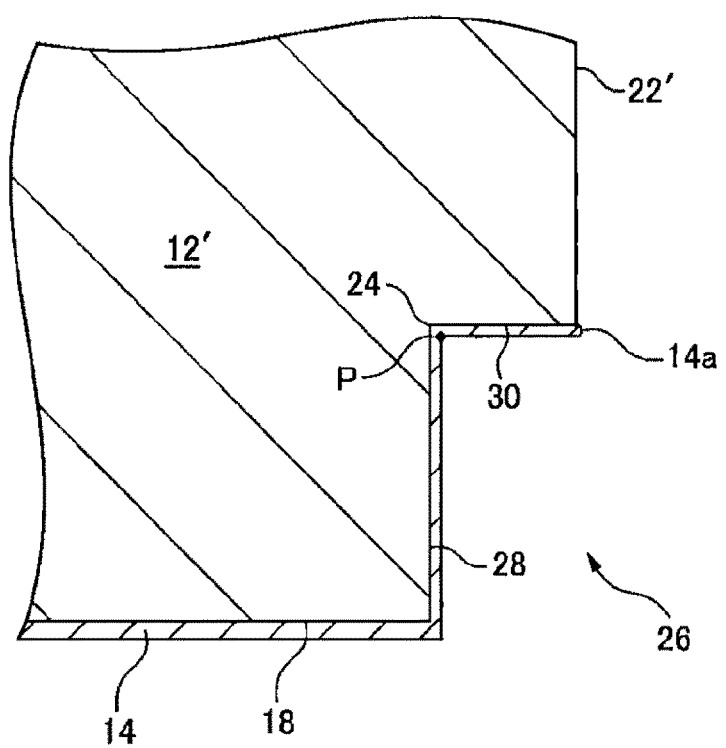
FIG. 8 illustrates a state where step S2 in FIG. 5 has ended.

As an example, the manufacturer coats the coating material by the coating material applicator 102 from the axial front end toward the axial rear end of the coating surface 18. By this coating, as illustrated in FIG. 8, the coating material 14 may be applied not only to the coating surface 18, but also to the first surface 28 and the second surface 30 of the recess 26. Note that FIG. 8 illustrates a state where the mask member 100 is removed after applying the coating material 14.

Referring again to FIG. 5, in step S3, the manufacturer machines the unmachined surface 22' of the base material 12'. For example, the manufacturer uses a machine tool to cut the unmachined surface 22' from the radially inner edge toward the outer edge. As a result, the above-described machined surface 22 is formed. When the tool of the machine tool reaches the radially outer edge of the unmachined surface 22' during this machining, the tool may contact an axial rear end 14a of the coating material 14 applied on the second surface 30, and apply a force radially outward. As a result, the coating material 14 on the second surface 30 may be peeled off radially outward from the second surface 30, with the rear end 14a as a starting point.

In this regard, in the present embodiment, since the coating surface 18 and the machined surface 22 are separated away from each other by the recess 26, it is possible to prevent the peeling of the coating material 14, that may be caused by the tool, from advancing to the coating material 14 on the coating surface 18. Specifically, referring to FIG. 8, when a force is applied radially outward to the rear end 14a of the coating material 14 from the tool, stress concentration occurs at a bent portion P of the coating material 14 formed at a connection 24 between the first surface 28 and the second surface 30, whereby the coating material 14 is easily broken at this bent portion P.

As a result, even if the force is applied radially outward to the rear end of the coating material 14 by contact with the tool, as illustrated in FIG. 4, only the coating material 14 on the second surface 30 is peeled off, and it is possible to prevent the peeling from advancing to the coating material 14 on the coating surface 18. Thus, the coating material 14 on the entire coating surface 18 can be protected. In this way, the above-described machined object 10 is manufactured.

Figure 9:
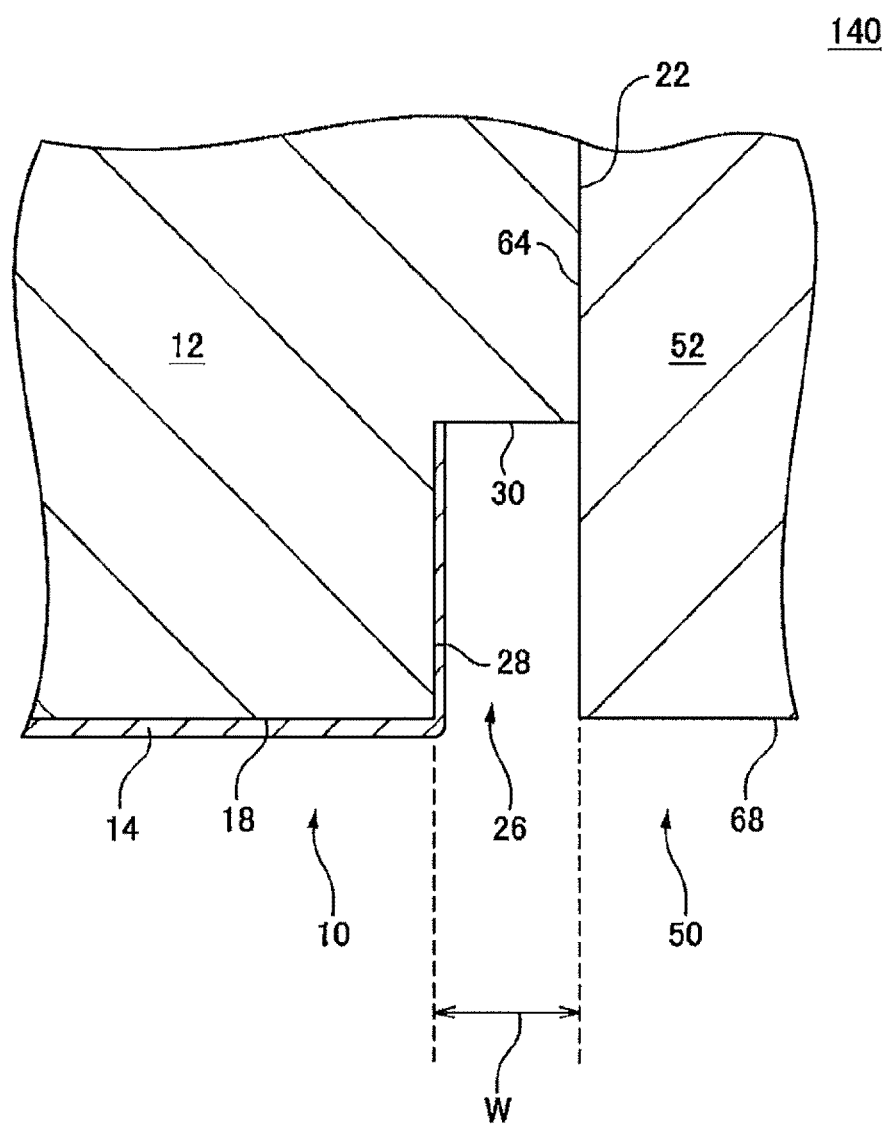
FIG. 9 is an enlarged cross-sectional view of an assembly made by step S4 in FIG. 5.

After manufacturing the machined object 10, the manufacturer produce an assembly 140 of the machined objects 10 and 50. Specifically, as illustrated in FIG. 9, the manufacturer couples the machined objects 10 and 50 to each other such that the machined surface 22 of the machined object 10 is in surface-contact with the end face 64 of the base plate 52 of the machined object 50. Since the machined surface 22 and the end face 64 have been machined, they closely contact with each other.

As described above, in the present embodiment, the coating material 14 on the coating surface 18 is not peeled off in step S3. In other words, the region where the coating material 14 may be peeled off by performing step S3 is limited within the region of the axial width W of the recess 26. Due to this, the aesthetics of the coating applied to the coating surface 18 can be improved. Note that the width W of the recess 26 corresponding to the region where the coating material 14 may be peeled off by performing step S3 is set to a value as small as possible (e.g., 1 mm or less) in view of the thickness of the coating material 14, from the perspective of the aesthetics of the coating on the coating surface 18.

In the present embodiment, since the first surface 28 and the second surface 30 of the recess 26 are orthogonal, the stress concentration can be effectively occurred at the bent portion P, whereby the coating material 14 can be reliably broken at the bent portion P when the coating material 14 on the second surface 30 is peeling off radially outward. Therefore, it is possible to effectively prevent the peeling off from advancing to the coating material 14 on the coating surface 18.

There are many variations of the recess 26 for preventing the coating from peeling off. Below, referring to FIG. 10 to FIG. 14, variations of the recess 26 will be described below. In a main body 12B illustrated in FIG. 10, a recess 110 is defined by a first surface 112 extending radially inward from the coating surface 18 and a second surface 114 extending axially frontward from the machined surface 22 so as to be connected to the first surface 112. The second surface 114 is inclined relative to the machined surface 22 so as to form an angle $\theta_1$ (>90°) between the second surface 114 and the machined surface 22, whereby the first surface 112 and the second surface 114 are connected to each other so as to form the angle $\theta_1$ of an acute angle.

Figure 10:
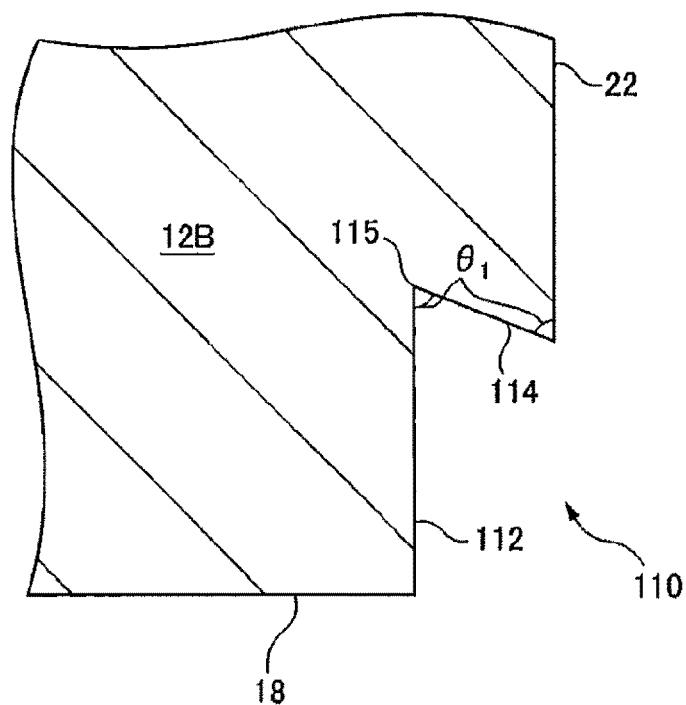
FIG. 10 is an enlarged cross-sectional view of a main body of another embodiment.

According to the example illustrated in FIG. 10, in step S3 described above, stress concentration can be more effectively occurred at the bent portion of the coating material 14 that may be formed at the connection 115 between the first surface 112 and the second surface 114. Therefore, it is possible to prevent the peeling off from advancing to the coating material 14 on the coating surface 18 in step S3.

Figure 11:
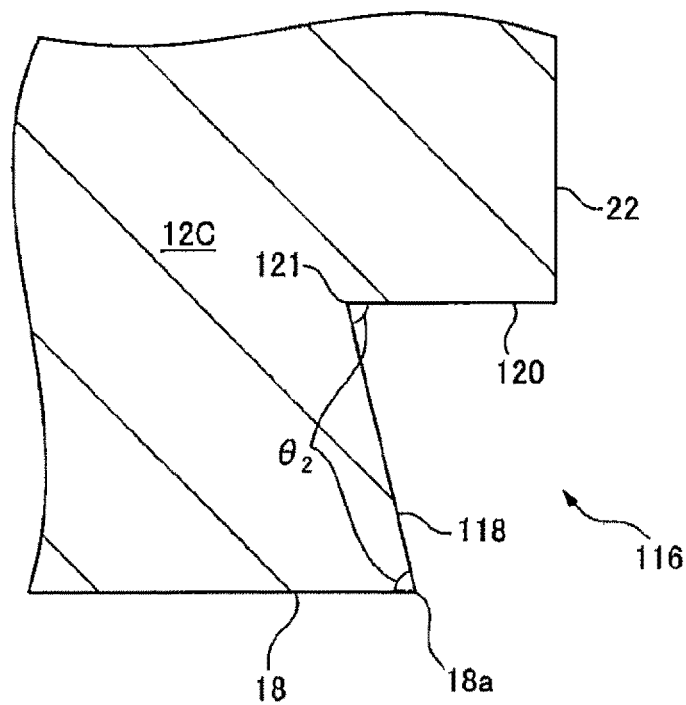
FIG. 11 is an enlarged cross-sectional view of a main body of yet another embodiment.

In a main body 12C illustrated in FIG. 11, a recess 116 is defined by a first surface 118 extending radially inward from the coating surface 18 and a second surface 120 extending axially frontward from the machined surface 22 so as to be connected to the first surface 118. The first surface 118 is inclined relative to the coating surface 18 so as to form an angle $\theta_2$ (>90) between the first surface 118 and the coating surface 18, whereby the first surface 118 and second surface 120 are connected to each other so as to form the angle $\theta_2$ of an acute angle.

According to the example illustrated in FIG. 11, similar to the example illustrated in FIG. 10, the stress concentration can be more effectively occurred at the bent portion of the coating material 14 that may be formed at the connection 121 between the first surface 118 and the second surface 120, in step S3 described above. Therefore, it is possible to prevent the peeling off from advancing to the coating material 14 on the coating surface 18.

In addition, according to the example illustrated in FIG. 11, the first surface 118 is inclined axially frontward as it extends radially inward from the coating surface 18, whereby the recess 116 is formed to be recessed axially frontward with respect to the axial rear end 18a of the coating surface 18. According to this configuration, when the coating material is applied radially inward with respect to the coating surface 18 in step S2, the amount of the coating material that attaches to the first surface 118 can be reduced, and therefore it is possible to make it difficult for the peeling off to advance to the coating material 14 on the coating surface 18.

Figure 12:
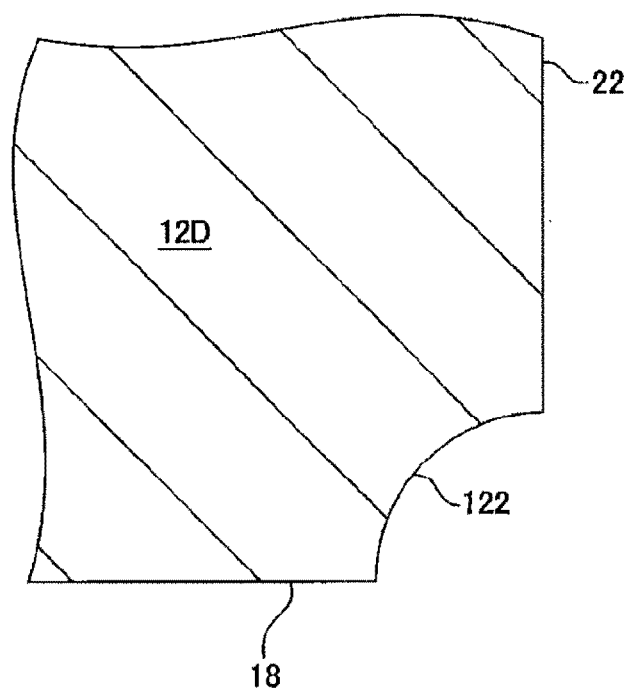
FIG. 12 is an enlarged cross-sectional view of a main body of yet another embodiment.

In a main body 12D illustrated in FIG. 12, a recess 122 is defined by a curved surface (e.g., a circular arc-shaped surface). Also in this example, since the coating surface 18 and the machined surface 22 can be separated from each other by the recess 122, it is possible to make it difficult for the peeling off to advance to the coating material 14 on the coating surface 18 in step S3 described above.

Figure 13:
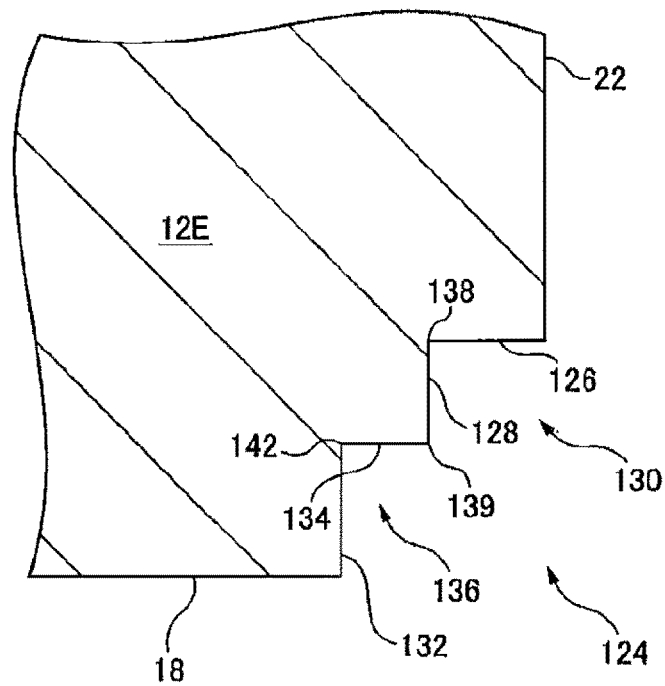
FIG. 13 is an enlarged cross-sectional view of a main body of yet another embodiment.

In a main body 12E illustrated in FIG. 13, a recess 124 is formed at the boundary of the coating surface 18 and the machined surface 22, wherein the recess 124 includes a first recess 130 and a second recess 136 arranged between the first recess 130 and the coating surface 18. The first recess 130 is defined by a first surface 126 and a second surface 128. The first surface 126 extends axially frontward from the machined surface 22 so as to be orthogonally connected to the second surface 128 at its axial front end.

The second recess 136 is defined by a third surface 132 and a fourth surface 134. The third surface 132 extends radially inward from the coating surface 18 so as to be orthogonally connected to the fourth surface 134 at its radially inner end. Further, the second surface 128 and the fourth surface 134 are orthogonal to each other. Thus, in the example illustrated in FIG. 13, the coating surface 18 and the machined surface 22 are separated from each other by the recess 124 comprised of the two recesses 130 and 136.

According to this configuration, in step S3 described above, the stress concentration occurs at a first bent portion of the coating material 14 that may be formed at the connection 138 of the surfaces 126 and 128, a second bent portion of the coating material 14 that may be formed at the connection 139 of the surfaces 128 and 134, and a third bent portion of the coating material 14 that may be formed at the connection 142 of the surfaces 132 and 134, whereby the coating material 14 may be easily broken at these three bent portions. As a result, it is possible to more effectively prevent the peeling off from advancing to the coating material 14 on the coating surface 18.

Figure 14:
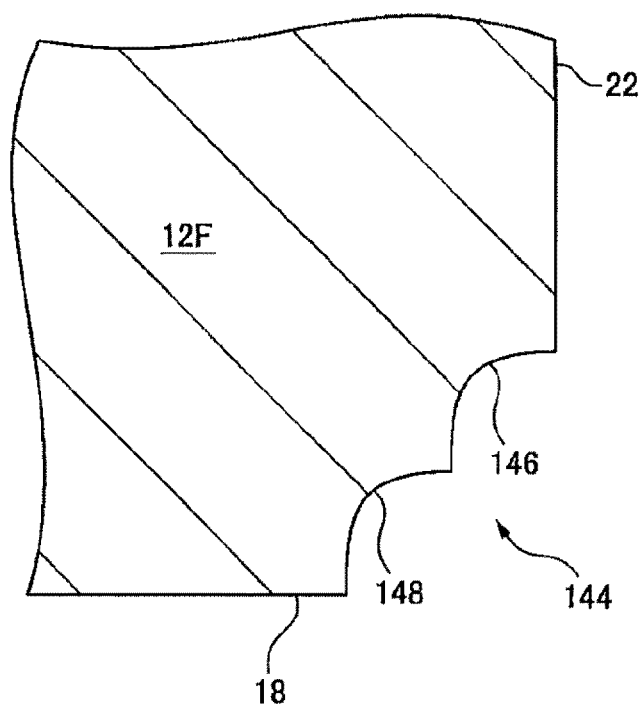
FIG. 14 is an enlarged cross-sectional view of a main body of yet another embodiment.

In a main body 12F illustrated in FIG. 14, a recess 144 is formed at the boundary between the coating surface 18 and the machined surface 22, wherein the recess 144 includes a first recess 146 and a second recess 148 arranged between the first recess 146 and the coating surface 18. Each of the first recess 146 and the second recess 148 is defined by a curved surface (e.g., circular arc-shaped surface). According to the example illustrated in FIG. 14, it is possible to make it difficult for the peeling off to advance to the coating material 14 on the coating surface 18 in step S3 described above.

Figure 15:
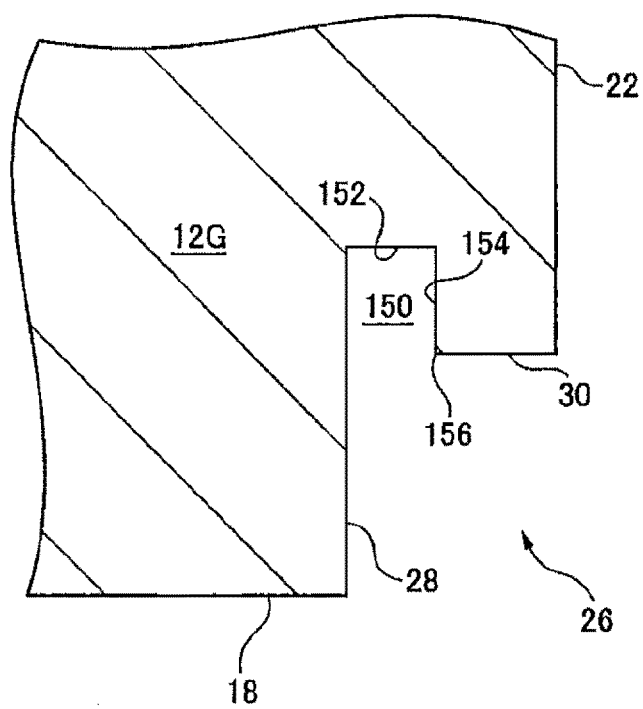
FIG. 15 is an enlarged cross-sectional view of a main body of yet another embodiment.

A main body 12G illustrated in FIG. 15 includes, in addition to the recess 26 defined by the first surface 28 and the second surface 30, an additional recess 150 formed at the main body 12G so as to be recessed radially inward from the second surface 30. The recess 150 is defined by the first surface 28, a third surface 152, and a fourth surface 154.

The third surface 152 extends axially rearward from the radially inner end of the first surface 28, and is orthogonal to the first surface 28. The fourth surface 154 extends radially inward from an axially front end of the second surface 30 so as to face (specifically, be in parallel with) the first surface 28, and is orthogonally connected to the third surface 152 at its radially inner end. The recess 150 may be formed so as to extend over the entire boundary of the coating surface 18 and the machined surface 22 (i.e., the entire periphery of the main body 12G), similar to the recess 26. Alternatively, a plurality of recesses 150 may be arranged along the recess 26 at predetermined intervals.

According to the example illustrated in FIG. 15, when the coating material is applied in step S2 described above, the coating material enters the recess 150. Then, if the force is applied radially outward from the tool to the coating material 14 on the second surface 30 in step S3 described above, the stress concentration easily occurs between the coating material 14 on the second surface 30 and the coating material 14 that enters the recess 150 so as to stick to the surfaces 152 and 154 of the recesses 150 (i.e., the position of a connection 156 of the surfaces 30 and 154). As a result, it is possible to more-effectively prevent the peeling off from advancing to the coating material 14 on the coating surface 18. Note that the recess 150 may be defined by a curved surface.

Figure 16:
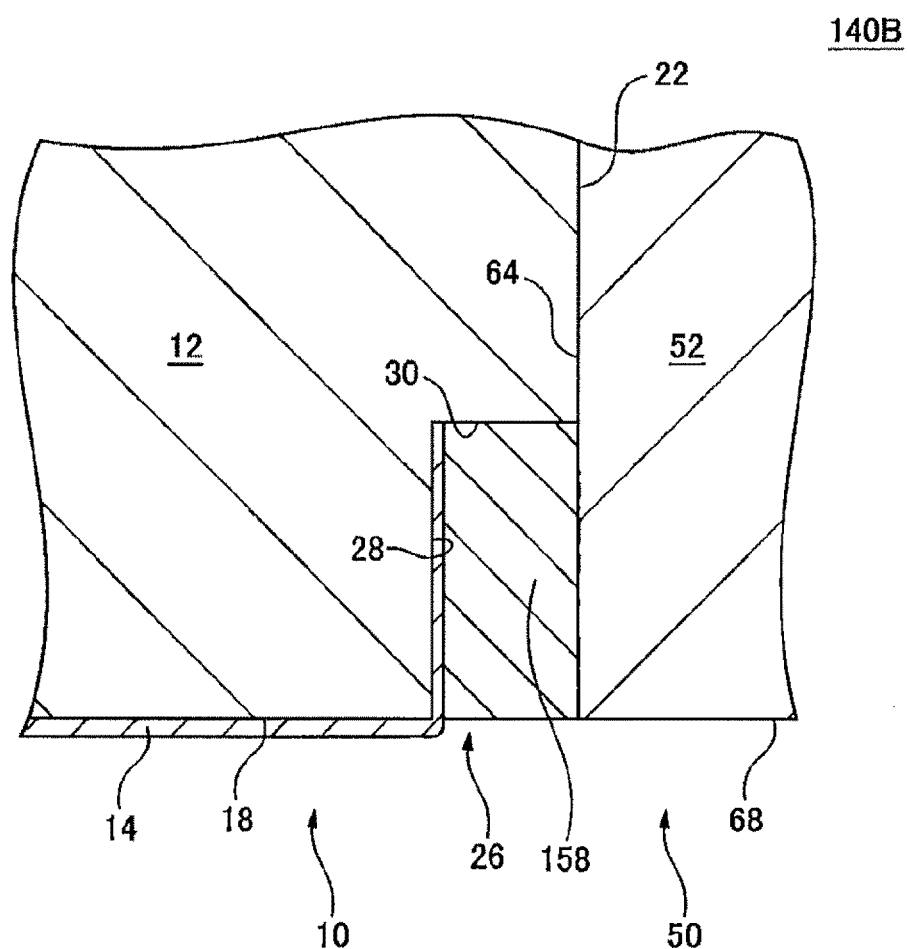
FIG. 16 is an enlarged cross-sectional view of an assembly of a machined object of another embodiment.

In the assembly 140 illustrated in FIG. 9, a sealing material may be further provided in the recess 26. Such an embodiment is illustrated in FIG. 16. In an assembly 140B illustrated in FIG. 16, an annular sealing material 158 is arranged in the recess 26. The sealing material 158 extends in the circumferential direction so as to surround the axis O (FIG. 1) of the machined objects 10 and 50, and seals the gap between the machined surface 22 of the machined object 10 and the end face 64 of the machined object 50. As a result, it is possible to prevent foreign matter, such as cutting fluid, from entering between the machined surface 22 and the end face 64.

The sealing material 158 may be a ring-shaped member independent from the machined objects 10 and 50, that can be detachably attached to the recess 26. In this case, the sealing material 158 is comprised of a flexible material such as rubber, and the manufacturer fits the sealing material 158 in the recess 26 after coupling the machined objects 10 and 50. Alternatively, the sealing material 158 may be comprised of a filler filled in the recess 26. In this case, the sealing material 158 is made from an adhesive, a rubber, a curable resin, etc., and the manufacturer fills the sealing material 158 into the recess 26 after coupling the machined objects 10 and 50.

Note that the recesses 26, 110, 116, 122, 124, 144 and 150 for preventing the peeling off may be formed at the boundary between any machined surface and coating surface. For example, the outer circumferential surface 68 of the base plate 52 of the machined object 50 may be a coating surface to be coated, and a recess may be formed at the boundary between the outer circumferential surface 68 and the end face 64 of the base plate 52. Such an embodiment is illustrated in FIG. 17.

Figure 17:
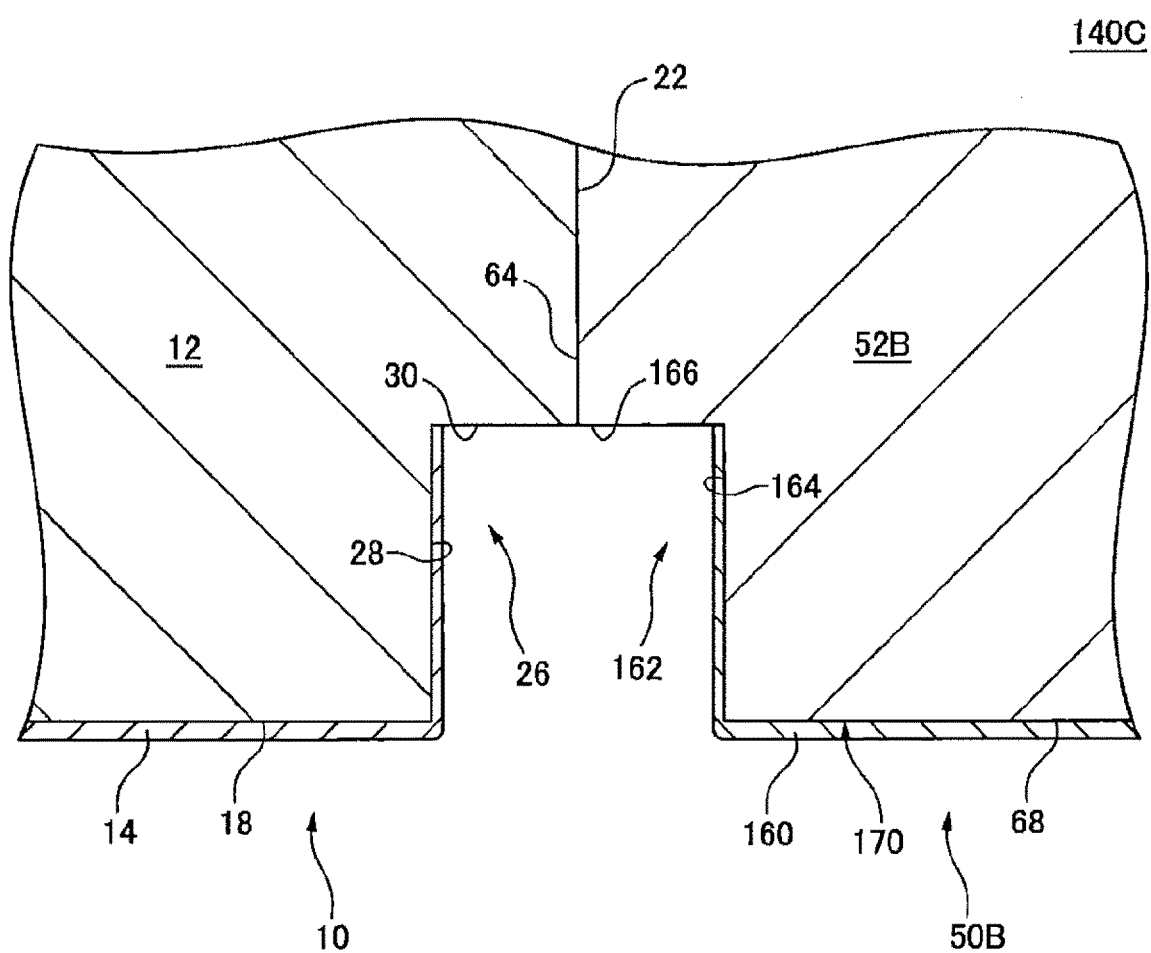
FIG. 17 is an enlarged cross-sectional view of an assembly of a machined object of yet another embodiment.

In an assembly 140C illustrated in FIG. 17, a machined object 50B includes a main body 170 having the same shape as the above-described machined object 50, and a coating material 160 applied to the coating surface (outer circumferential surface) 68 of a base plate 52B of the main body 170. A recess 162 is formed at the boundary between the coating surface 68 and the machined surface (end face) 64 of the main body 170 so as to be recessed inward from the coating surface 68 and the machined surface 64. The recess 162 is defined by a first surface 164 extending radially inward from an axially front end of the coating surface 68 and a second surface 166 extending axially rearward from a radially outer end of the machined surface 64 so as to be orthogonal to the first surface 164.

The machined object 50B may be manufactured according to the flow illustrated in FIG. 5. Specifically, in step S1, a base material (not illustrated) of the main body 170 is provided, and in step S2, the coating material 160 is applied to the coating surface 68 of the main body 170. Then, in step S3, an unmachined surface corresponding to the machined surface 64 of the base material of the main body 170 is machined so as to form the machined surface 64.

In this way, the machined object 50B can be manufactured. In step S3 when manufacturing the machined object 50B, even if the tool of the machine tool applies a force radially outward to the coating material on the second surface 166, the coating material 160 on the coating surface 68 can be prevented from peeling off by the recess 162.

Note that the configuration of the above-described recess 110, 116, 122, 124, 144 or 150 may be applied to the recess 162. Further, in the assembly 140C, a sealing material may be arranged inside the recesses 26 and 162, in order for the gap between the machined surfaces 22 and 64 to be sealed by the sealing material.

Furthermore, the axially front end face 20 of the main body 12 of the machined object 10 is machined to form the machined surface 20, wherein the recess 26, 110, 116, 122, 124, 144 or 150 may be formed at the boundary between the machined surface 20 and the coating surface 18. Furthermore, the machined surface and the coating surface may be parallel to each other.

Figure 18:
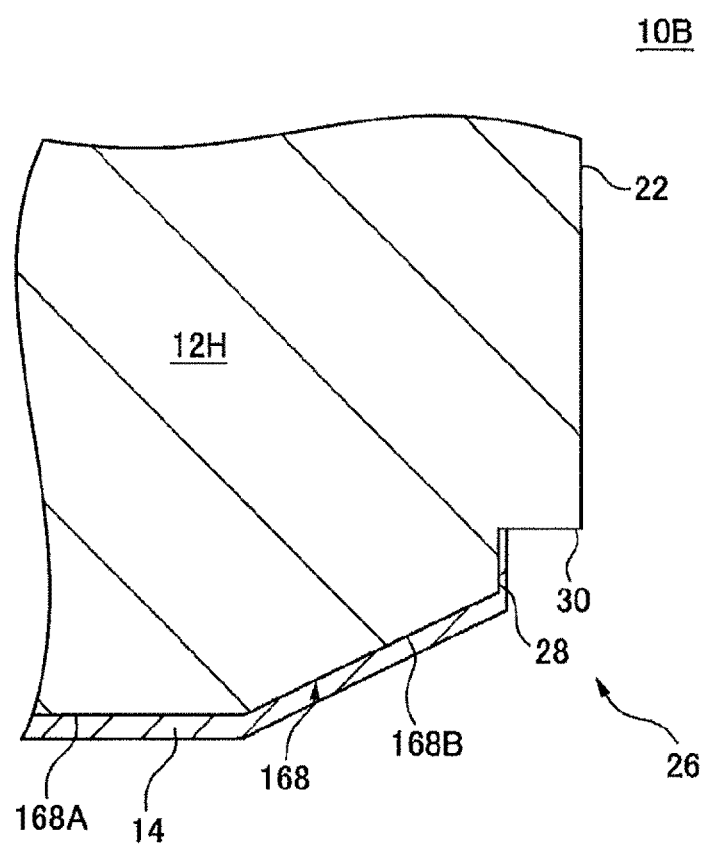
FIG. 18 is an enlarged cross-sectional view of a machined object of another embodiment.

Alternatively, the machined surface and the coating surface may intersect with each other so as to form an acute or an obtuse angle, rather than being orthogonally connected. Such an embodiment is illustrated in FIG. 18. In the machined object 10B illustrated in FIG. 18, the main body 12H includes a coating surface 168 arranged adjacent to the machined surface 22 via the boundary. The coating surface 168 includes a first surface 168A that is parallel to the axial direction and a second surface 168B inclined with respect to the first surface 168A.

The recess 26 is formed at the boundary between the second surface 168B and the machined surface 22. As can be seen in FIG. 18, the virtual extension surface that extends the machined surface 22 radially outward and a virtual extension surface that extends the second surface 168B axially rearward intersect with each other so as to form an obtuse angle (i.e., an angle greater than 90°). Similarly, the machined surface 22 may include a first surface parallel to the radial direction and a second surface that is inclined with respect to the first surface.

Note that features of the various embodiments described above can be combined. For example, the additional recess 150 illustrated in FIG. 15 may be formed at at least one of the surfaces that define the recess 110, 116, 122, 124, 144 or 162. Alternatively, the surface 126, 128, 132 or 134 that define the recess 124 may be inclined similarly to the surface 114 or 118 of the recess 110 or 116. Further, the above-described recess 124 or 144 may be formed so as to include first to n-th recesses (n is an integer of 3 or greater).

Although the present disclosure has been described throughout the embodiments, the embodiments described above are not to limit the claimed invention.

The invention claimed is:

1. A machined object comprising:
a main body; and
a coating material applied to the main body,
wherein the main body includes:
 a machined surface that has been machined;
 a coating surface arranged adjacent to the machined surface via a boundary, the coating material being applied to the coating surface; and
 a recess formed at the main body so as to be recessed inward of the main body from the machined surface and the coating surface at the boundary, the recess extending along the boundary so as to separate the machined surface and the coating surface from each other, and
wherein the machined surface has been machined or cut by a machine tool and the machined surface is free from the coating material.

2. A machined object, comprising:
a main body; and
a coating material applied to the main body,
wherein the main body includes:
 a machined surface that has been machined;
 a coating surface arranged adjacent to the machined surface via a boundary, the coating material being applied to the coating surface; and
 a recess formed at the main body so as to be recessed inward of the main body from the machined surface and the coating surface at the boundary, the recess extending along the boundary so as to separate the machined surface and the coating surface from each other, and
wherein the recess includes:
 a first recess recessed inward of the main body from the machined surface; and
 a second recess arranged between the first recess and the coating surface, and recessed inward of the main body from the coating surface.

3. The machined object of claim 1, wherein the recess is defined by two surfaces intersecting with each other so as to form a predetermined angle.

4. The machined object of claim 3, wherein the predetermined angle is equal to or less than 90°.

5. The machined object of claim 3, wherein the main body further includes an additional recess formed to be recessed inward of the main body from one of the two surfaces defining the recess.

6. The machined object of claim 1, wherein a virtual extension surface of the machined surface intersects with a virtual extension surface of the coating surface so as to form an angle equal to or greater than 90°.

7. A method of manufacturing the machined object of claim 1, comprising:
providing a base material of the main body, the base material including:
 an unmachined surface;
 the coating surface arranged adjacent to the unmachined surface via a boundary; and
 the recess formed at the boundary; and
machining the unmachined surface to form the machined surface after applying the coating material to the coating surface of the base material.

8. The machined object of claim 1, wherein the recess is defined by a curved surface.

9. The machined object of claim 1, wherein the recess is defined by a circular arc-shaped surface.

10. The machined object of claim 1, further comprising a sealing material fitted in the recess.

11. An assembly, comprising:
the machined object of claim 1; and
a further machined object having a further machined surface in surface contact with the machined surface, wherein
the recess is defined by two surfaces intersecting with each other, and
one of the two surfaces of the recess faces the further machined surface of the further machined object by a width of 1 mm or less.

* * * * *